Figure 3:
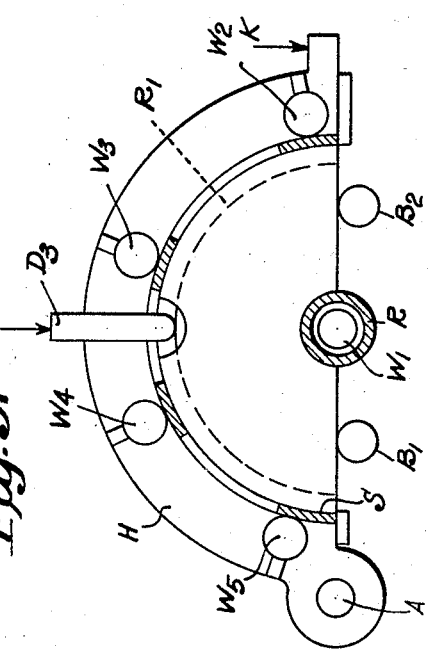

Sept. 30, 1941.   E. PASCHKE ET AL   2,257,643
METHOD OF MAKING ROTARY CONDENSERS
Filed June 25, 1940

Inventor
Erich Paschke,
Arthur Schmidt,
H. S. Grover
Attorney

Patented Sept. 30, 1941

2,257,643

UNITED STATES PATENT OFFICE

2,257,643

METHOD OF MAKING ROTARY CONDENSERS

Erich Paschke and Arthur Schmidt, Berlin, Germany, assignors to Telefunken Gesellschaft für Drahtlose Telegraphie m. b. H., Berlin, Germany, a corporation of Germany Application June 25, 1940, Serial No. 342,314
In Germany February 13, 1939

6 Claims. (Cl. 113—112)

The customary method of making rotary condensers of the plate type has been to manufacture the rotor plate packet and the stator plate packet separately, spacer pieces, where desired, being shifted between pairs of neighboring rotor plates or between pairs of neighboring stator plates prior to the attaching of the plates on tube pieces, rods, or the like serving to support them.

According to this method it was quite easy to make the distance between pairs of neighboring stator plates or the distance between neighboring rotor plates conform with close approximation to what they should be according to specifications. Upon assembly, however, it was found quite often that the distance which determines the capacity between one stator plate and the interleaved adjacent rotor plate failed to have the prescribed value. To be more precise, it was frequently discovered that either the whole rotor packet or the whole stator packet was too long or too short, with the result that usually only one rotor plate could be placed exactly in the middle between two adjacent stator plates, with the rest of the rotor plates being seated more or less unilaterally or off center in the spaces between pairs of neighboring stator plates.

According to the present invention the said difficulty is obviated and a rotary plate condenser of high precision and low sensitiveness to shock and vibration is created by piling up the various rotor plates and stator plates with interposition of spacers between a rotor plate and the neighboring stator plate, whereupon the rotor plates are attached to the shaft and the stator plates to a supporting rod or rods, hollow cylinder or the like, soldering being preferably used therefor.

The advantage which the invention offers flows from the following consideration: In the earlier manufacturing method the position of the rotor plates and the stator plates is affected by the thickness of the rotor plates and the stator plates. For instance, if all of the stator plates happen to be too thick by a fraction of what they should be, the result is that the entire stator plate will be too long by an amount equal to the total of the departure for each plate. There is then no longer any chance to assemble the rotor plate packet and the stator plate packet in such a way that each rotor plate will come to be centered exactly between adjacent stator plates the way it should be.

No such difficulty is able to arise in connection with the method here disclosed inasmuch as the spacers fix and determine precisely the distance between stator plate and adjacent rotor plate. In other words, the thickness of the plates themselves plays no part at all so far as the spacing of stator plate and adjacent rotor plate is concerned. In other words, without making any severe demands respecting the precision of the component or detail parts conditions can be made so that the spacings of the rotor plates from their neighboring stator plates will with close approximation measure up to the prescribed values. More particularly speaking, each of the rotor plates will be seated practically in the middle between pairs of neighboring stator plates. Inasmuch as in this position the capacity alteration, in the presence of a slight axial shift, is the lowest, it will be understood that also the temperature effect and the sensitiveness to shock and vibration will be essentially lower for a rotary condenser thus manufactured than in a rotary condenser made by the old method.

Figure 1:
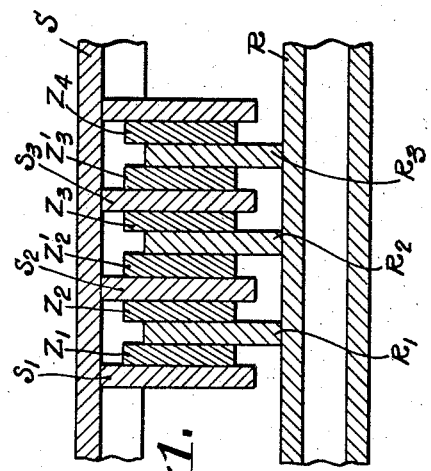

The principle underlying the method of the invention shall now be described in greater detail by reference to Figs. 1, 2 and 3 which disclose various stages involved in the method. Referring first to Fig. 1, upon a tubular rotor shaft R are first loosely seated a plurality of semi-circular rotor plates R1, R2, and R3, only three being shown by way of example. These rotor plates are interleaved between four suitably shaped semi-circular stator plates S1, S2, S3, S4, the outer edges of which, for the time being, bear loosely upon a hollow semi-cylinder or shell piece S. Between a stator plate and a rotor plate, which, for instance, may consist of brass like the rotor shaft R and the stator support S, are inserted interposed layers Z1, Z2, Z2', Z3, Z3', and Z4 which are also of semi-circular form, though slightly smaller in size than the stator and the rotor plates so that they are spaced sufficiently far apart from the points where the rotor plates are in contact with the shaft and the stator plates with the stator support. After these parts have been assembled, the entire pile or packet is pressed together, whereupon the tubular shaft R being tinned at the points of contact with the rotor plates as well as the similarly tinned cylinder S are heated, say, by resistances mounted in the neighborhood and heated by current in such a way that the fusion temperature of the solder is reached. Next the junctions are painted with flux so that the rotor plates are soldered fast on shaft R and the stator plates on the support S.

After cooling the interposed spacer layers Z1 to Z4 which may, for instance, consist of steel or some similar metal inhering low adhesion and friction in respect to brass to facilitate the withdrawal are removed from the spaces between the plates so that the rotor packet and the stator packet become removed from each other and may be set into the tub-like or similar frame structure adapted to support the assembly. If care is taken so that one of the rotor plates is placed exactly midway between the neighboring stator plates, then this condition will be positively fulfilled also for the other rotor plates.

In making gang condensers it will be found expedient to use for each and every condenser the same spacers in order that such disparities as may exist between the gauges of these spacers may affect the various condensers in a similar way. In fact, the desired condition will be attained perfectly if the spacers for each unit of ganged condensers are used in the same sequence.

Figure 2:
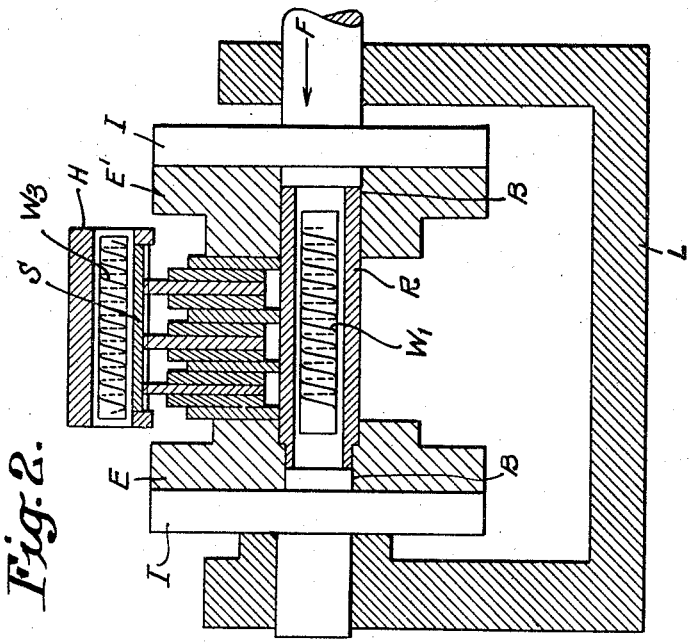

An exemplified embodiment of a device in which the method here disclosed may be carried into practice under particularly favorable conditions is shown in Fig. 2 which is a section taken through the shaft and in Fig. 3 being a section at right angles to the shaft.

In a bearing block or support L are journaled the header disks E and E' in such a way that the former is stationary in an axial direction, while E' is axially shiftable. Both these disks have bore holes B in which the rotor shaft R of tubular shape may be fitted and centered.

The plate packet or assembly piled up in a way as described by reference to Fig. 1 (comprising the stator plates, the rotor plates and the spacer plates) is now interposed between the disks E and E' and compressed by spring pressure F (shown schematically) applied to the axially movable header disk E'. Upon a shaft A parallel to that of bore holes B is journaled the supporting clip H in which the stator shell S is laid. The bolts B1 and B2 serve as bearings for the plate packet.

Now, by a force K (again shown only schematically), the supporter or holder part H with the stator shell S is inverted over the plate packet. The stator plates are recessed at a certain place so that the rotor plates are somewhat free. At this place a presser piece D3 bears upon the rotor plates so that the latter come to bear on the rotor shaft.

In the rotor shaft R and in the openings in the holder piece H are inserted the heater resistances W1—W5. The whole assembly is heated by these resistances so that at the soldering points the temperature reaches the fusion point of tin previously placed upon the stator shell S and the rotor shaft R.

To prevent the heat from being carried off to the outside, the device is insulated from the bearing support by means of insulation plates I one either side of the headers.

What we claim is:

1. Method of making rotary plate condensers of the type having rotor plates affixed to a control shaft and stator plates affixed to a supporting member, with the characteristic feature that the various rotor plates and stator plates are piled up in superposed relation with interposition of spacer plates between each rotor plate and the neighboring stator plate, disposing a control shaft in contacting relation with the rotor plates, disposing a supporting member in contacting relation with the stator plates, soldering the contacts between said cooperating elements, and finally removing the spacer plates.

2. Method as claimed in claim 1, with the characteristic feature that in making gang condensers of the rotary kind the same spacer plates are used for making the various rotary condenser units.

3. Method as claimed in claim 1, with the characteristic feature that the spacer plates for each rotary condenser unit are employed in the same order and sequence.

4. The method of making variable condensers of the rotary type which consists in placing spacing elements between alternate stator and rotor plates, disposing the assembly of said plates and spacing elements between a rotor shaft and a stator support so that the rotor plates are in contacting relation with the shaft and the stator plates are in contacting relation with the support, and applying solder and heat to the points of contact between rotor plates and rotor shaft and between stator plates and stator support.

5. In a variable condenser of the rotary type which is provided with stator plates having a support and rotor plates mounted on a control shaft, the method of assembling such condenser which consists in setting a plurality of rotor plates on said control shaft in spaced relation, disposing a plurality of stator plates in contact with their support and in interleaved relation with the rotor plates, introducing spacer elements between successive stator and rotor plates, applying solder and heat to the points of contact between rotor plates and control shaft and between stator plates and stator support, and subsequently removing said spacer elements.

6. In a variable condenser of the rotary type which is provided with stator plates having a support and rotor plates mounted on a control shaft, the method of producing such condenser which consists in disposing the control shaft between a pair of end members one of which is movable in an axial direction, positioning a plurality of rotor plates on said control shaft in spaced relation, disposing a plurality of stator plates in contact with their support and in interleaved relation with the rotor plates, introducing spacer elements between successive stator and rotor plates, applying pressure to the movable end member whereby the rotor plates, stator plates and spacer elements are rigidly clamped together, applying solder and heat to the points of contact between rotor plates and control shaft and between stator plates and stator support, and subsequently removing said spacer elements.

ARTHUR SCHMIDT.
ERICH PASCHKE.